(12) United States Patent
Xu

(10) Patent No.: US 12,513,561 B2
(45) Date of Patent: Dec. 30, 2025

(54) METHOD AND NETWORK NODE FOR QoS NOTIFICATION

(71) Applicant: Telefonaktiebolaget LM Ericsson (publ), Stockholm (SE)

(72) Inventor: Wenliang Xu, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 326 days.

(21) Appl. No.: 17/799,151

(22) PCT Filed: Dec. 30, 2020

(86) PCT No.: PCT/CN2020/141702
§ 371 (c)(1),
(2) Date: Aug. 11, 2022

(87) PCT Pub. No.: WO2021/159884
PCT Pub. Date: Aug. 19, 2021

(65) Prior Publication Data
US 2023/0081774 A1 Mar. 16, 2023

(30) Foreign Application Priority Data
Feb. 14, 2020 (WO) ................ PCT/CN2020/075383

(51) Int. Cl.
*H04W 28/02* (2009.01)

(52) U.S. Cl.
CPC ... *H04W 28/0268* (2013.01); *H04W 28/0215* (2013.01)

(58) Field of Classification Search
CPC ......... H04W 28/0268; H04W 28/0215; H04W 28/24; H04L 41/5019; H04L 41/34; H04L 41/5051; H04L 41/5003
(Continued)

(56) References Cited

U.S. PATENT DOCUMENTS 10,932,108 B1  2/2021 Balmakhtar et al.
12,289,695 B2  4/2025 Kim et al.
(Continued)

FOREIGN PATENT DOCUMENTS

WO  2019228214 A1  12/2019

OTHER PUBLICATIONS

3GPP, "3GPP TS 23.503 V16.3.0", 3rd Generation Partnership Project; Technical Specification Group Services and System Aspects; Policy and charging control framework for the 5G System (5GS); Stage 2 (Release 16), Dec. 2019, 1-112.
(Continued)

*Primary Examiner* — Obaidul Huq
(74) *Attorney, Agent, or Firm* — Murphy, Bilak & Homiller, PLLC

(57) ABSTRACT

The present disclosure provides a method (200) in a Network Exposure Function, NEF. The method (200) includes: receiving (210), from an Application Function, AF, a request to create a session with a requested Quality of Service, QoS; subscribing (220) to a first QoS notification from a Policy Control Function, PCF; receiving (230), from the PCF, the first QoS notification indicating that the requested QoS is not guaranteed or the requested QoS is guaranteed; and transmitting (240), in response to receiving the first QoS notification, a second QoS notification indicating that the requested QoS is not guaranteed or the requested QoS is guaranteed to the AF.

16 Claims, 4 Drawing Sheets

(58) Field of Classification Search
USPC .................................................. 370/229, 230
See application file for complete search history.

(56) References Cited

U.S. PATENT DOCUMENTS

| | | | |
|---|---|---|---|
| 2017/0317894 | A1 | 11/2017 | Dao et al. |
| 2018/0192390 | A1 | 7/2018 | Li et al. |
| 2019/0215731 | A1* | 7/2019 | Qiao ..................... H04W 24/06 |
| 2020/0112907 | A1* | 4/2020 | Dao ........................ H04W 4/40 |
| 2020/0267785 | A1* | 8/2020 | Talebi Fard ............ H04L 45/04 |
| 2021/0136620 | A1* | 5/2021 | Laitila ................... H04W 28/06 |
| 2022/0053364 | A1* | 2/2022 | Kim .................. H04W 28/0268 |

OTHER PUBLICATIONS

3GPP, "3GPP TS 29.122 V16.4.0", 3rd Generation Partnership Project; Technical Specification Group Core Network and Terminals; T8 reference point for Northbound APIs; (Release 16), Dec. 2019, 1-338.

3GPP, "3GPP TS 29.514 V16.3.0", 3rd Generation Partnership Project; Technical Specification Group Core Network and Terminals; 5G System; Policy Authorization Service; Stage 3 (Release 16), Dec. 2019, 1-143.

3GPP, "3rd Generation Partnership Project; Technical Specification Group Core Network and Terminals; 5G System; Network Exposure Function Northbound APIs; Stage 3 (Release 16)", 3GPP TS 29.522 V16.1.0, Sep. 2019, 82 pages.

3GPP, "3rd Generation Partnership Project; Technical Specification Group Services and System Aspects; Procedures for the 5G System (5GS); Stage 2 (Release 16)", 3GPP TS 23.502 V16.3.0, Dec. 2019, 1-558.

Samsung, "Revoke Alternative Service Requirement request", SA WG2 Meeting #S2-136 S2-1911616, (revision of 82-19xxxxx), Reno, Nevada, USA, Nov. 18-22, 2019, 1-7.

Samsung, "Revoke Alternative Service Requirement request", SA WG2 Meeting #S2-136 S2-1911986, (revision of S2-1911616), Reno, Nevada, USA, Nov. 18-22, 2019, 1-8.

Samsung, "Revoke Alternative Service Requirement request", SA WG2 Meeting #S2-136, S2-1912007, (revision of S2-1911986), Reno, Nevada, USA, Nov. 18-22, 2019, 1-8.

Unknown, Author, "Corrections to handling of alternative QoS Profiles", 3GPP TSG-SA2 Meeting #135, S2-1910016 (Revision of S2-1910009 was 09267), Split, Croatia, Oct. 14-18, 2019, 1-12.

Unknown, Author, "CR Pack4 on 5GS_Ph1-CT", 3GPP TSG-CT Meeting #82, CP-183126, Sorrento, Italy, Dec. 10, 2018-Dec. 11, 2018, 1-19.

Unknown, Author, "Update alternative service requirement request", 3GPP TSG-SA WG2 Meeting #136AH, S2-2001152, Incheon, Korea, Jan. 13-17, 2020, 1-7.

Unknown, Author, "TSN parameters", 3GPP TSG-SA2 Meeting #136-AH S2-2000075 Incheon, Korea (Republic Of), Jan. 13, 2020-Jan. 17, 2020, 1-28.

Unknown, Author, "Corrections on QNC trigger name", 3GPP TSG-CT WG3 Meeting #99 West Palm Beach, Florida(US), C3-187485 (revision of C3-187281), Nov. 26-30, 2018, 1-17.

Unknown, Author, "Proposed updates to solution #11 to align with AF session set up to request QoS", SA WG2 Meeting #S2-136, Reno NV, USA, S2-1911122, Nov. 18-22, 2019, 1-10.

Liu, Jennifer, "UE Session Management QOS Capability Negotiation and QOS Control Realization", U.S. Appl. No. 62/572,291; NC2020/0004832; Nokia Technologies, Oct. 13, 2017, 1-57.

* cited by examiner

METHOD AND NETWORK NODE FOR QoS NOTIFICATION

TECHNICAL FIELD

The present disclosure relates to wireless communication, and more particularly, to a method and a network node for Quality of Service (QoS) notification.

BACKGROUND

This section is intended to provide a background to the various embodiments of the technology described in this disclosure. The description in this section may include concepts that could be pursued but are not necessarily ones that have been previously conceived or pursued. Therefore, unless otherwise indicated herein, what is described in this section is not prior art to the description and/or claims of this disclosure and is not admitted being prior art by the mere inclusion in this section.

The Network Exposure Function (NEF) supports external exposure of capabilities of network functions. The external exposure can be categorized as Monitoring capability, Provisioning capability, Policy/Charging capability and Analytics reporting capability. The Monitoring capability is for monitoring of specific events for terminal devices (or referred to as User Equipments or UEs) in the $5^{th}$ Generation (5G) system and making such monitoring events information available for external exposure via the NEF. The Provisioning capability is for allowing provision of information by external parties for use by UEs in the 5G system. The Policy/Charging capability is for handling QoS and charging policy for UEs based on requests from external parties. The Policy/Charging capability involves means that allow requesting for session and charging policy, enforcing QoS policy, and applying accounting functionality, and can be used for QoS/priority handling for sessions of UEs, and for setting applicable charging parties or charging rates. The Analytics reporting capability is for allowing external parties to fetch or subscribe/unsubscribe to analytics information generated by the 5G system.

The NEF Application Programing Interface (API) can allow an Application Function (AF) to set up an AF session with a requested QoS. FIG. 1 shows a sequence flow for such procedure.

As shown, at 1.1, an AF sends a request to reserve resources for an AF session using Nnef_AFsessionWithQoS_Create request message (containing UE address, AF Identifier, Flow description(s), QoS reference (or referred to as "requested QoS" or "required QoS" hereinafter), and optionally Alternative Service Requirements (or referred to as "Alternative QoS requirements" hereinafter)) to an NEF. Optionally, a period of time or a traffic volume for the requested QoS can be included in the AF request. The NEF assigns a Transaction Reference ID to the Nnef_AFsessionWithQoS_Create request.

At 1.2, the NEF authorizes the AF request and may apply policies to control the overall amount of pre-defined QoS authorized for the AF. If the authorization is not granted, steps 1.3 and 1.4 are skipped and the NEF replies to the AF with a Result value indicating that the authorization failed.

At 1.3, the NEF interacts with a Policy Control Function (PCF) by triggering a Npcf_PolicyAuthorization_Create request and provides UE address, AF Identifier, Flow description(s) and the QoS reference including the optionally received period of time or traffic volume which is mapped to sponsored data connectivity information. The PCF derives the required QoS parameters based on the information provided by the NEF and determines whether this QoS is allowed (according to the PCF configuration for this AF), and notifies the result to the NEF. In addition, if the Alternative Service Requirements are provided, the PCF derives the Alternative QoS parameter set(s) from the one or more QoS reference parameters in the same prioritized order. The PCF notifies the NEF whether the transmission resources corresponding to the QoS request are established or not.

At 1.4, the PCF determines whether the request is allowed and notifies the NEF if the request is not authorized. If the request is not authorized, the NEF responds to the AF in step 1.5 with a Result value indicating that the authorization failed.

At 1.5, the NEF sends a Nnef_AFsessionWithQoS_Create response message (containing Transaction Reference ID and Result) to the AF. The Result indicates whether the request is granted or not.

At 1.6, the NEF shall send a Npcf_Policy Authorization_Subscribe message to the PCF to subscribe to notifications of Resource allocation status and may subscribe to other events.

At 1.7, when the event condition is met, the PCF sends a Npcf_PolicyAuthorization_Notify message to the NEF notifying about the event.

At 1.8, the NEF sends a Nnef_AFsessionWithQoS_Notify message with the event reported by the PCF to the AF.

For further details of the above procedure, reference can be made to the 3rd Generation Partnership Project (3GPP) Technical Specification (TS) 23.502 V16.3.0, which is incorporated herein by reference in its entirety.

As specified in Section 4.15.6.6 of TS 23.502, when the AF includes alternative QoS requirements in the Nnef_AFsessionWithQoS_Create request at 1.1, the NEF will act as an internal AF to interact with the PCF, and in this case, the NEF shall also subscribe to notifications when the requested QoS can no longer (or can again) be fulfilled from the PCF, as described in Section 6.1.3.22 of TS 23.503, V16.3.0, and Section 5.6.2.15 of TS 29.514, V16.3.0, each of which is incorporated herein by reference in its entirety. For example, the requested QoS may be mapped to a bandwidth for a Service Data Flow (SDF) requiring a Guaranteed Bit Rate (GBR). When the PCF receives a policy control request trigger from a Session Management Function (SMF) for QoS notification, the PCF can report to the NEF (based on subscription) about the current situation of the QoS satisfaction and also a currently applied QoS reference.

SUMMARY

However, it is currently a problem to be solved in the 3GPP standardization regarding whether the NEF is to provide the AF with such QoS notification and, if so, which information is to be included in the notification.

It is an object of the present disclosure to provide a method and a network node, capable of allowing an NEF to provide an AF with a proper QoS notification.

According to a first aspect of the present disclosure, a method in an NEF is provided. The method includes: receiving, from an AF, a request to create a session with a requested QoS. The method further includes: subscribing to a first QoS notification from a PCF. The method further includes: receiving, from the PCF, the first QoS notification indicating that the requested QoS is not guaranteed or the requested QoS is guaranteed. The method further includes: transmitting, in response to receiving the first QoS notification, a second QoS notification indicating that the requested QoS is not guaranteed or the requested QoS is guaranteed to the AF.

In an embodiment, the request may contain one or more alternative QoS requirements.

In an embodiment, each of the first QoS notification and the second QoS notification, when indicating that the requested QoS is not guaranteed, may further indicate one of the one or more alternative QoS requirements that can be guaranteed or is currently applied.

In an embodiment, the method may further include: performing a mapping between a QoS reference used at the AF and a QoS reference used at the PCF.

In an embodiment, the operation of mapping may include: mapping a QoS reference associated with the one alternative QoS requirement that can be guaranteed or is currently applied, as indicated in the first QoS notification, to a QoS reference associated with the one alternative QoS requirement that can be guaranteed or is currently applied in the second QoS notification.

In an embodiment, the request may contain an indication that a QoS notification feature is supported at the AF.

In an embodiment, the QoS notification feature may be an AlternativeQoS_5G feature.

In an embodiment, the operations of subscribing and transmitting may be performed in response to determining that the request contains the indication.

According to a second aspect of the present disclosure, a network node is provided. The network node includes a processor and a memory. The memory stores instructions enabling the network node to implement an NEF. The network node is configured to, when implementing the NEF, perform the method according to the above first aspect.

According to a third aspect of the present disclosure, a computer-readable storage medium is provided. The computer-readable storage medium has computer-readable instructions embodied therein. When the computer-readable instructions are executed by a processor of a network node, the computer-readable instructions configure the network node to perform the method according to the above first aspect.

According to a fourth aspect of the present disclosure, a method in an AF is provided. The method includes: transmitting, to an NEF, a request to create a session with a requested QoS. The method further includes: receiving, from the NEF, a QoS notification indicating that the requested QoS is not guaranteed or the requested QoS is guaranteed.

In an embodiment, the method may further include: applying a rate adaptation to the session based on the QoS notification.

In an embodiment, the method may further include: updating the requested QoS based on the QoS notification.

In an embodiment, the request may contain one or more alternative QoS requirements.

In an embodiment, the QoS notification, when indicating that the requested QoS is not guaranteed, may further indicate one of the one or more alternative QoS requirements that can be guaranteed or is currently applied.

In an embodiment, the method may further include: applying a rate adaptation to the session based on the one alternative QoS requirement that can be guaranteed or is currently applied.

In an embodiment, the method may further include: updating the requested QoS based on the one alternative QoS requirement that can be guaranteed or is currently applied.

In an embodiment, the request may contain an indication that a QoS notification feature is supported at the AF.

In an embodiment, the QoS notification feature may be an AlternativeQoS_5G feature.

According to a fifth aspect of the present disclosure, a network node is provided. The network node includes a processor and a memory. The memory stores instructions enabling the network node to implement an AF. The network node is configured to, when implementing the AF, perform the method according to the above fourth aspect.

According to a sixth aspect of the present disclosure, a computer-readable storage medium is provided. The computer-readable storage medium has computer-readable instructions embodied therein. When the computer-readable instructions are executed by a processor of a network node, the computer-readable instructions configure the network node to perform the method according to the above fourth aspect.

With the embodiments of the present disclosure, upon receiving a request to create a session with a requested QoS from an AF, an NEF can subscribe to a first QoS notification from a PCF, the first QoS notification indicating that the requested QoS is not guaranteed or the requested QoS is guaranteed. In response to receiving the first QoS notification from the PCF, the NEF can transmit a second QoS notification indicating that the requested QoS is not guaranteed or the requested QoS is guaranteed to the AF. In this way, the NEF can notify the AF that the requested QoS is not guaranteed or the requested QoS is guaranteed. Accordingly, the AF may apply a rate adaptation or update the requested QoS based on the notification.

BRIEF DESCRIPTION OF THE DRAWINGS

The above and other objects, features and advantages will be more apparent from the following description of embodiments with reference to the figures, in which.

DETAILED DESCRIPTION

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Within the context of this disclosure, the term "terminal device" or "UE" encompasses a device which is able to communicate with a network node, such as a base station, or with another wireless device by transmitting and/or receiving wireless signals. Thus, the term "terminal device" or "UE" encompasses, but is not limited to: a mobile phone, a stationary or mobile wireless device for machine-to-machine communication, an integrated or embedded wireless card, an externally plugged in wireless card, etc.

Within the context of this disclosure, a "network node" or a "network function" can be implemented in a physical node or a virtualized environment, e.g., a cloud environment.

Figure 2:
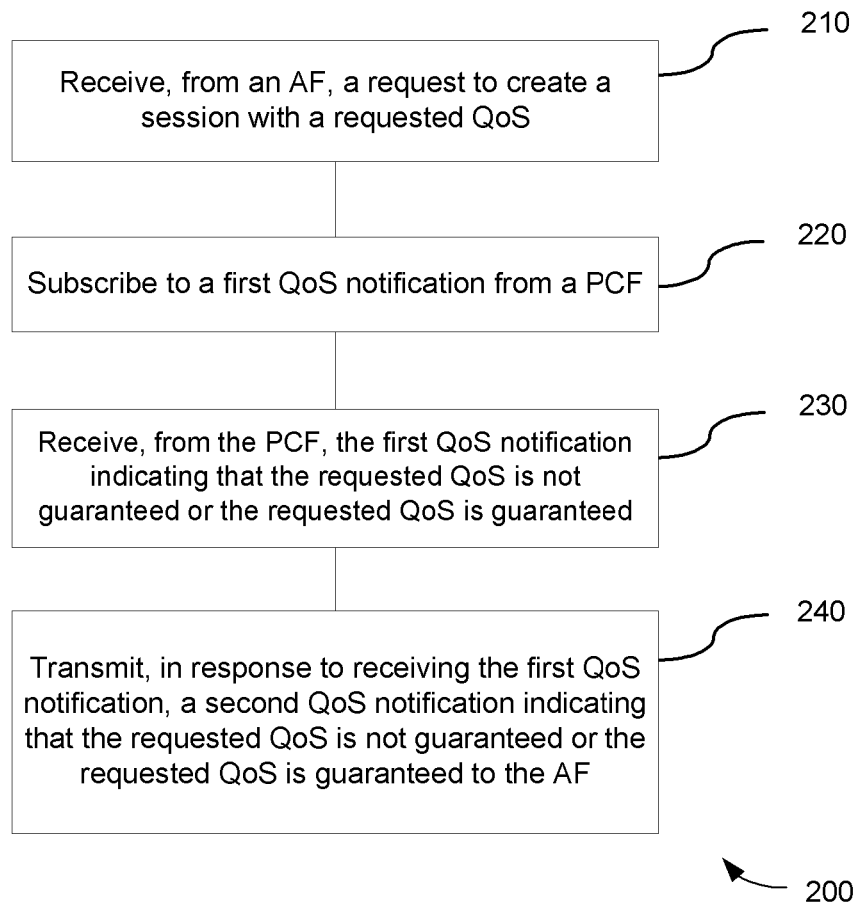
FIG. 2 is a flowchart illustrating a method in an NEF according to an embodiment of the present disclosure.

FIG. 2 is a flowchart illustrating a method 200 in an NEF according to an embodiment of the present disclosure.

At block 210, the NEF receives from an AF a request to create a session with a requested QoS. For example, the request may be a Nnef_AFsessionWithQoS_Create request as described above in connection with step 1.1 in FIG. 1. In an example, the request may contain one or more alternative QoS requirements, as described above in connection with step 1.1 in FIG. 1.

At block 220, the NEF subscribes to a first QoS notification from a PCF. The first QoS notification indicates that the requested QoS is not guaranteed (e.g., changed from being guaranteed to not being guaranteed) or the requested QoS is guaranteed (e.g., changed from not being guaranteed to being guaranteed). This subscription may use a Npcf_PolicyAuthorization_Subscribe message as described in step 1.6 in FIG. 1. The first QoS notification may use e.g., a QOS_NOTIF event as specified in Section 5.6.3.9 of TS 29.514, which has two values "GUARANTEED" and "NOT_GUARANTEED" as defined in Table 5.6.3.9-1 of TS 29.514, as reproduced as Table 1 below:

TABLE 1

Enumeration QosNotifType

| Enumeration value | Description | Applicability |
|---|---|---|
| GUARANTEED | The QoS targets of one or more SDFs are guaranteed again. | |
| NOT_GUARANTEED | The QoS targets of one or more SDFs are not being guaranteed. | |

The request received in the block 210 may contain one or more alternative QoS requirements. In this case, the first QoS notification, when indicating that the requested QoS is not guaranteed, may further indicate one of the one or more alternative QoS requirements that can be guaranteed or is currently applied. For example, the first QoS notification may use a data type "QosNotificationControlInfo" as specified in Section 5.6.2.15 of TS 29.514.

Figure 1:
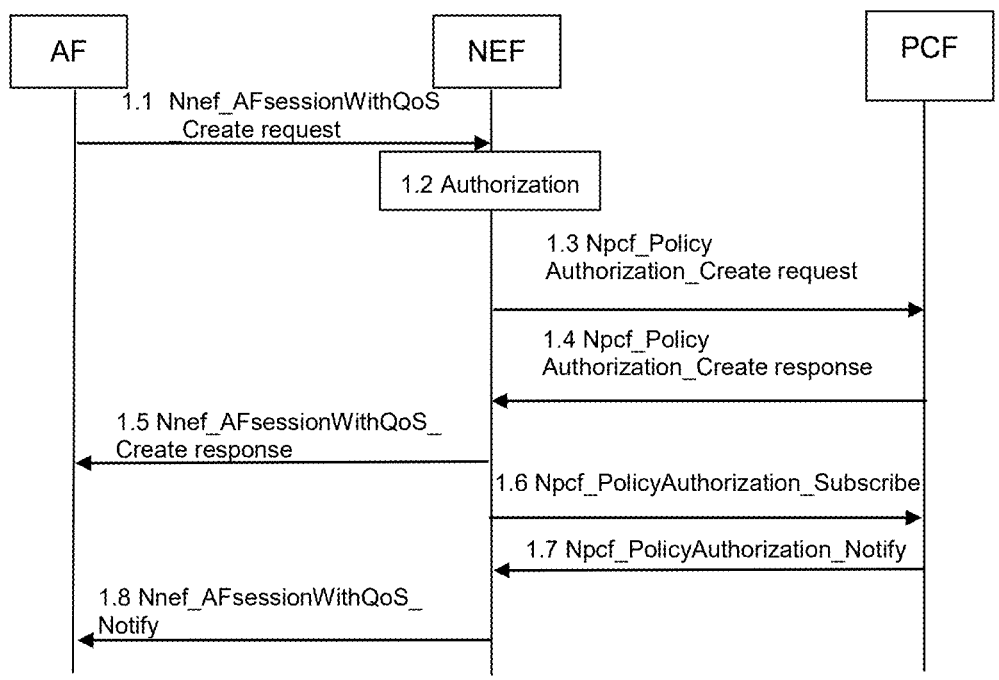
FIG. 1 is sequence diagram showing a procedure for setting up an AF session with a requested QoS.

At block 230, the first QoS notification is received from the PCF (e.g., in a Npcf_PolicyAuthorization_Notify message as described in step 1.7 in FIG. 1).

At block 240, in response to receiving the first QoS notification, the NEF transmits a second QoS notification indicating that the requested QoS is not guaranteed or the requested QoS is guaranteed to the AF.

Here, in an example, for the second QoS notification, a data type "UserPlaneNotificationData" and a data type "UserPlaneEventReport" can be defined, as shown in Table 2 and Table 3 below:

TABLE 2

Definition of the UserPlaneNotificationData data type

| Attribute name | Data type | Cardinality | Description |
|---|---|---|---|
| eventReports | array(UserPlaneEventReport) | 1 . . . N | Contains the reported event and applicable information |

TABLE 3

Definition of the UserPlaneEventReport data type

| Attribute name | Data type | Cardinality | Description |
|---|---|---|---|
| event | UserPlaneEvent | 1 | Indicates the event reported by the SCEF. |
| appliedQosRef | string | 0 . . . 1 | The currently applied QoS reference. Applicable for event QOS_NOT_GUARANTEED. |

The "UserPlaneEvent" in Table 3 may have at least two values, "QOS_GUARANTEED" or "QOS_NOT_GUARANTEED", as defined in Table 4 below:

TABLE 4

Enumeration UserPlaneEvent

| Enumeration value | Description | Applicability |
|---|---|---|
| QOS_GUARANTEED | The QoS targets of one or more SDFs are guaranteed again. | AlternativeQoS_5G |
| QOS_NOT_GUARANTEED | The QoS targets of one or more SDFs are not being guaranteed. | AlternativeQoS_5G |

When the first QoS notification indicates the one alternative QoS requirement that can be guaranteed or is currently applied, the second QoS notification may also indicate the one alternative QoS requirement that can be guaranteed or is currently applied, e.g., referring to "appliedQosRef" in Table 3.

The second QoS notification transmitted in the block 230 can use a Nnef_AFsessionWithQoS_Notify message, as described in step 1.8 in FIG. 1, which can be enhanced to carry the UserPlaneEvent (e.g., "QOS_GUARANTEED" or "QOS_NOT_GUARANTEED"), and optionally "appliedQosRef" in case of "QOS_NOT_GUARANTEED".

In an example, QoS references used at the AF may be the same as or different from those used at the PCF. In the latter case, the NEF can perform mapping operations between the QoS references used at the AF and the QoS references used at the PCF. For example, the NEF can map a QoS reference associated with the one alternative QoS requirement that can be guaranteed or is currently applied, as indicated in the first QoS notification, to a QoS reference associated with the one alternative QoS requirement that can be guaranteed or is currently applied in the second QoS notification.

In an example, the request received in the block 210 may contain an indication that a QoS notification feature is supported at the AF. The operations of subscribing in the block 220 and transmitting in the block 240 may be performed in response to determining that the request contains the indication. For example, the feature can be e.g., "AlternativeQoS_5G" as shown in Table 4, indicating the support of alternative QoS requirements and/or QoS notification (i.e., "QOS_GUARANTEED" or "QOS_NOT_GUARANTEED").

Figure 3:
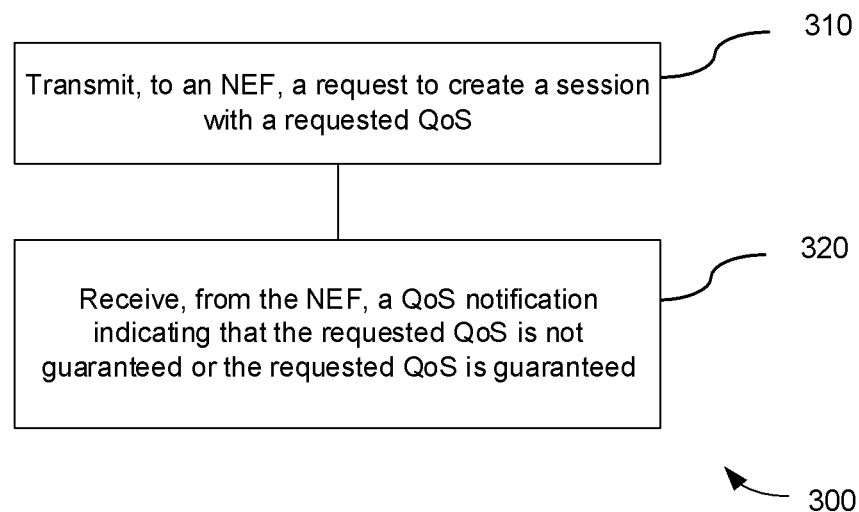
FIG. 3 is a flowchart illustrating a method in an AF according to another embodiment of the present disclosure.

FIG. 3 is a flowchart illustrating a method 300 in an AF according to an embodiment of the present disclosure.

At block 310, the AF transmits, to an NEF, a request to create a session with a requested QoS. The request here corresponds to the request as described above in connection with the block 210 in FIG. 1, and details thereof will thus be omitted here.

At block 320, the AF receives, from the NEF, a QoS notification indicating that the requested QoS is not guaranteed (e.g., changed from being guaranteed to not being guaranteed) or the requested QoS is guaranteed (e.g., changed from not being guaranteed to being guaranteed). The QoS notification here corresponds to the second QoS notification as described above in connection with the block 240 in FIG. 1, and details thereof will thus be omitted here.

In an example, the AF can apply a rate adaptation to the session based on the QoS notification. Alternatively, the AF can update the requested QoS based on the QoS notification. For example, the requested QoS may be a bandwidth of 50 Mbps (Million bits per second) for a video streaming service. When the QoS notification indicates that the requested QoS is not guaranteed, the AF can apply a rate adaptation at an application level, e.g., to reduce a resolution or frame rate for the video streaming service (e.g., from 4K to 720p), or can reduce the requested QoS (e.g., to a bandwidth of 30 Mbps) by updating the QoS reference associated with the requested QoS using Hyper Text Transfer Protocol (HTTP) PUT or PATCH as specified in Section 4.4.13 of TS 29.122, V16.4.0.

The request transmitted in the block 310 contains one or more alternative QoS requirements. The QoS notification, when indicating that the requested QoS is not guaranteed, may further indicate one of the one or more alternative QoS requirements that can be guaranteed or is currently applied. In this case, the AF may apply a rate adaptation to the session or update the requested QoS based on the one alternative QoS requirement that can be guaranteed or is currently applied. For example, the requested QoS may be a bandwidth of 50 Mbps for a video streaming service. When the QoS notification indicates that the requested QoS is not guaranteed and a bandwidth of 30 MHz can be guaranteed or currently applied, the AF can apply a rate adaptation at an application level based on the bandwidth of 30 Mbps, e.g., to reduce a resolution or frame rate for the video streaming service (e.g., from 4K to 720p), or can reduce the requested QoS (e.g., to a bandwidth of 30 Mbps) by updating the QoS reference associated with the requested QoS using Hyper Text Transfer Protocol (HTTP) PUT or PATCH as specified in Section 4.4.13 of TS 29.122.

In an example, the request transmitted in the block 310 may contain an indication that a QoS notification feature is supported at the AF. As described above, the feature can be e.g., "AlternativeQoS_5G" as shown in Table 4, indicating the support of alternative QoS requirements and/or QoS notification (i.e., "QOS_GUARANTEED" or "QOS_NOT_GUARANTEED").

Figure 4:
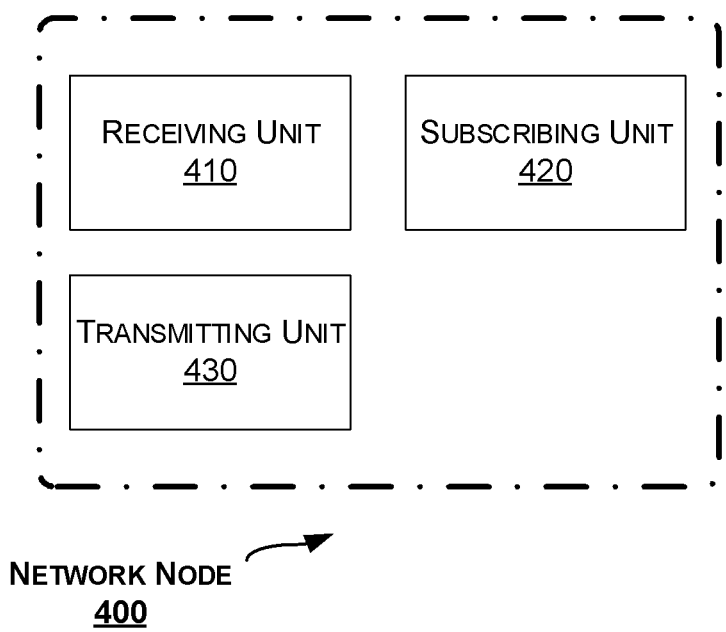
FIG. 4 is a block diagram of a network node for implementing an NEF according to an embodiment of the present disclosure.

Correspondingly to the method 200 as described above, a network node is provided. FIG. 4 is a block diagram of a network node 400 for implementing an NEF according to an embodiment of the present disclosure.

The network node 400 can be operative to, when implementing an NEF, perform the method 200 as shown in FIG. 2. As shown in FIG. 4, the network node 400 includes a receiving unit 410 configured to receive, from an AF, a request to create a session with a requested QoS. The network node 400 further includes a subscribing unit 420 configured to subscribe to a first QoS notification from a PCF. The receiving unit 410 is further configured to receive, from the PCF, the first QoS notification indicating that the requested QoS is not guaranteed or the requested QoS is guaranteed. The network node 400 further includes a transmitting unit 430 configured to transmit, in response to receiving the first QoS notification, a second QoS notification indicating that the requested QoS is not guaranteed or the requested QoS is guaranteed to the AF.

In an embodiment, the request may contain one or more alternative QoS requirements.

In an embodiment, each of the first QoS notification and the second QoS notification, when indicating that the requested QoS is not guaranteed, may further indicate one of the one or more alternative QoS requirements that can be guaranteed or is currently applied.

In an embodiment, the network node 400 may further include a mapping unit configured to perform a mapping between a QoS reference used at the AF and a QoS reference used at the PCF.

In an embodiment, the operation of mapping may include: mapping a QoS reference associated with the one alternative QoS requirement that can be guaranteed or is currently applied, as indicated in the first QoS notification, to a QoS reference associated with the one alternative QoS requirement that can be guaranteed or is currently applied in the second QoS notification.

In an embodiment, the request may contain an indication that a QoS notification feature is supported at the AF.

In an embodiment, the QoS notification feature may be an AlternativeQoS_5G feature.

In an embodiment, the operation performed by the subscribing unit 420 and the operation performed by the transmitting unit 430 may be performed in response to determining that the request contains the indication.

The units 410, 420, and 430 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 2.

Figure 5:
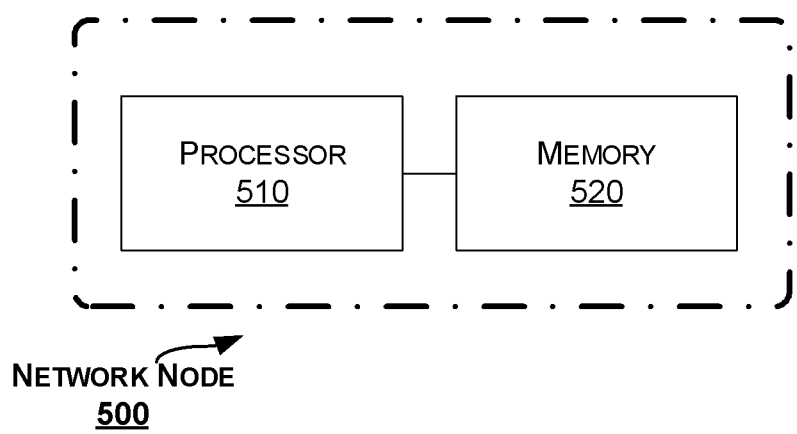
FIG. 5 is a block diagram of a network node for implementing an NEF according to another embodiment of the present disclosure.

FIG. 5 is a block diagram of a network node 500 for implementing an NEF according to another embodiment of the present disclosure.

The network node 500 includes a processor 510 and a memory 520. The memory 520 may contain instructions executable by the processor 510 whereby the network node 500 is operative to, when implementing the NEF, perform the actions, e.g., of the procedure described earlier in conjunction with FIG. 2. Particularly, the memory 520 contains instructions executable by the processor 510 whereby the network node 500 is operative to, when implementing the NEF: receive, from an AF, a request to create a session with a requested QoS; subscribe to a first QoS notification from a PCF; receive, from the PCF, the first QoS notification indicating that the requested QoS is not guaranteed or the requested QoS is guaranteed; and transmit, in response to receiving the first QoS notification, a second QoS notification indicating that the requested QoS is not guaranteed or the requested QoS is guaranteed to the AF.

In an embodiment, the request may contain one or more alternative QoS requirements.

In an embodiment, each of the first QoS notification and the second QoS notification, when indicating that the requested QoS is not guaranteed, may further indicate one of the one or more alternative QoS requirements that can be guaranteed or is currently applied.

In an embodiment, the memory 520 may further contain instructions executable by the processor 510 whereby the network node 500 is operative to, when implementing the NEF: perform a mapping between a QoS reference used at the AF and a QoS reference used at the PCF.

In an embodiment, the operation of mapping may include: mapping a QoS reference associated with the one alternative QoS requirement that can be guaranteed or is currently applied, as indicated in the first QoS notification, to a QoS reference associated with the one alternative QoS requirement that can be guaranteed or is currently applied in the second QoS notification.

In an embodiment, the request may contain an indication that a QoS notification feature is supported at the AF.

In an embodiment, the QoS notification feature may be an AlternativeQoS_5G feature.

In an embodiment, the operations of subscribing and transmitting may be performed in response to determining that the request contains the indication.

Figure 6:
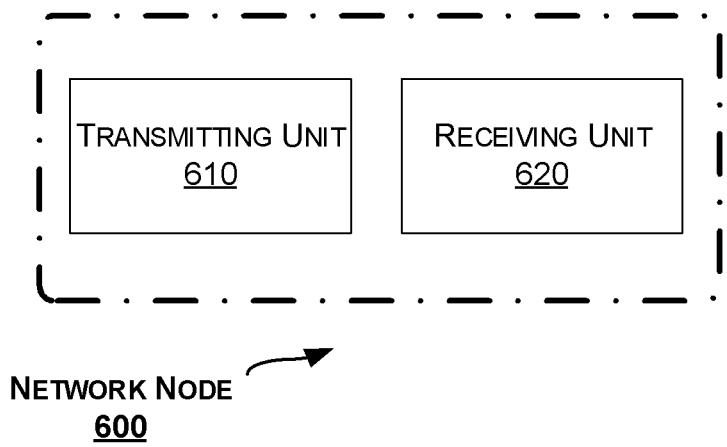
FIG. 6 is a block diagram of a network node for implementing an AF according to an embodiment of the present disclosure.

Correspondingly to the method 300 as described above, a network node is provided. FIG. 6 is a block diagram of a network node 600 for implementing an AF according to an embodiment of the present disclosure.

The network node 600 can be operative to, when implementing an AF, perform the method 300 as shown in FIG. 3. As shown in FIG. 6, the network node 600 includes a transmitting unit 610 configured to transmit, to an NEF, a request to create a session with a requested QoS. The network node 600 further includes a receiving unit 620 configured to receive, from the NEF, a QoS notification indicating that the requested QoS is not guaranteed or the requested QoS is guaranteed.

In an embodiment, the network node 600 may further include a rate adaptation unit configured to apply a rate adaptation to the session based on the QoS notification.

In an embodiment, the network node 600 may further include an updating unit configured to update the requested QoS based on the QoS notification.

In an embodiment, the request may contain one or more alternative QoS requirements.

In an embodiment, the QoS notification, when indicating that the requested QoS is not guaranteed, may further indicate one of the one or more alternative QoS requirements that can be guaranteed or is currently applied.

In an embodiment, the network node 600 may further include a rate adaptation unit configured to apply a rate adaptation to the session based on the one alternative QoS requirement that can be guaranteed or is currently applied.

In an embodiment, the network node 600 may further include an updating unit configured to update the requested QoS based on the one alternative QoS requirement that can be guaranteed or is currently applied.

In an embodiment, the request may contain an indication that a QoS notification feature is supported at the AF.

In an embodiment, the QoS notification feature may be an AlternativeQoS_5G feature.

The units 610 and 620 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 3.

Figure 7:
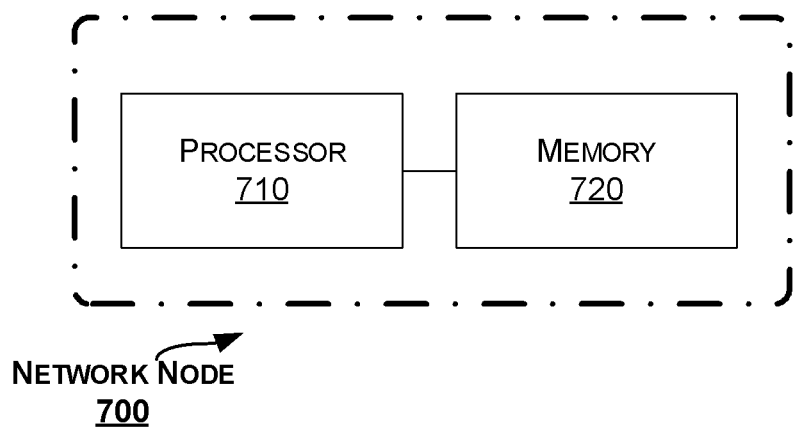
FIG. 7 is a block diagram of a network node for implementing an AF according to another embodiment of the present disclosure.

FIG. 7 is a block diagram of a network node 700 for implementing an AF according to another embodiment of the present disclosure.

The network node 700 includes a processor 710 and a memory 720. The memory 720 may contain instructions executable by the processor 710 whereby the network node 700 is operative to, when implementing the AF, perform the actions, e.g., of the procedure described earlier in conjunction with FIG. 3. Particularly, the memory 720 contains instructions executable by the processor 710 whereby the network node 700 is operative to, when implementing the AF: transmit, to an NEF, a request to create a session with a requested QoS; and receive, from the NEF, a QoS notification indicating that the requested QoS is not guaranteed or the requested QoS is guaranteed.

In an embodiment, the memory 720 may further contain instructions executable by the processor 710 whereby the network node 700 is operative to, when implementing the AF: apply a rate adaptation to the session based on the QoS notification.

In an embodiment, the memory 720 may further contain instructions executable by the processor 710 whereby the network node 700 is operative to, when implementing the AF: update the requested QoS based on the QoS notification.

In an embodiment, the request may contain one or more alternative QoS requirements.

In an embodiment, the QoS notification, when indicating that the requested QoS is not guaranteed, may further indicate one of the one or more alternative QoS requirements that can be guaranteed or is currently applied.

In an embodiment, the memory 720 may further contain instructions executable by the processor 710 whereby the network node 700 is operative to, when implementing the AF: apply a rate adaptation to the session based on the one alternative QoS requirement that can be guaranteed or is currently applied.

In an embodiment, the memory 720 may further contain instructions executable by the processor 710 whereby the network node 700 is operative to, when implementing the AF: update the requested QoS based on the one alternative QoS requirement that can be guaranteed or is currently applied.

In an embodiment, the request may contain an indication that a QoS notification feature is supported at the AF.

In an embodiment, the QoS notification feature may be an AlternativeQoS_5G feature.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 510 causes the network node 500 to perform the actions, e.g., of the procedure described earlier in conjunction with FIG. 2, or code/computer readable instructions, which when executed by the processor 710 causes the network node 700 to perform the actions, e.g., of the procedure described earlier in conjunction with FIG. 3.

The computer program product may be configured as a computer program code structured in computer program modules. The computer program modules could essentially perform the actions of the flow illustrated in FIG. 2 or 3.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random Access Memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a Network Exposure Function (NEF), comprising:
   receiving, from an Application Function (AF), a request to create a session with a requested Quality of Service (QOS), wherein the request contains one or more alternative QoS requirements;
   subscribing to a first QoS notification from a Policy Control Function (PCF);
   receiving, from the PCF, the first QoS notification, wherein the first QoS notification indicates that the requested QoS is not guaranteed and further indicates one of the one or more alternative QoS requirements that can be guaranteed or is currently applied; and
   transmitting, to the AF, in response to receiving the first QoS notification, a second QoS notification, wherein the second QoS notification indicates that the requested QoS is not guaranteed and further indicates the one of the one or more alternative QoS requirements that can be guaranteed or is currently applied or is currently applied.

2. The method of claim 1, further comprising: performing a mapping between a QoS reference used at the AF and a QoS reference used at the PCF.

3. The method of claim 2, wherein said mapping comprises: mapping a QoS reference associated with the one alternative QoS requirement that can be guaranteed or is currently applied, as indicated in the first QoS notification, to a QoS reference associated with the one alternative QoS requirement that can be guaranteed or is currently applied in the second QoS notification.

4. The method of claim 1, wherein the request contains an indication that a QoS notification feature is supported at the AF.

5. The method of claim 4, wherein the QoS notification feature is an AlternativeQoS_5G feature.

6. The method of claim 4, wherein said subscribing and said transmitting are performed in response to determining that the request contains the indication.

7. A network node comprising a processor and a memory, the memory comprising instructions enabling the network node to implement a Network Exposure Function (NEF), the network node being configured to, when implementing the NEF, perform:
   receiving, from an Application Function (AF), a request to create a session with a requested Quality of Service (QOS), wherein the request contains one or more alternative QoS requirements;
   subscribing to a first QoS notification from a Policy Control Function (PCF);
   receiving, from the PCF, the first QoS notification, wherein the first QoS notification indicates that the requested QoS is not guaranteed, and further indicates one of the one or more alternative QoS requirements that can be guaranteed or is currently applied; and
   transmitting, in response to receiving the first QoS notification, a second QoS notification, wherein the second QoS notification indicates that the requested QoS is not guaranteed and further indicates the one of the one or more alternative QoS requirements that can be guaranteed or is currently applied or is currently applied.

8. The network node of claim 7, wherein the network node is further configured to, when implementing the NEF:

perform a mapping between a QoS reference used at the AF and a QoS reference used at the PCF, wherein said mapping comprises: mapping a QoS reference associated with the one alternative QoS requirement that can be guaranteed or is currently applied, as indicated in the first QoS notification, to a QoS reference associated with the one alternative QoS requirement that can be guaranteed or is currently applied in the second QoS notification.

9. A method in an Application Function (AF), comprising:

transmitting, to a Network Exposure Function (NEF), a request to create a session with a requested Quality of Service (QOS), wherein the request contains one or more alternative QoS requirements; and receiving, from the NEF, a QoS notification indicating that the requested QoS is not guaranteed and further indicates one of the one or more alternative QoS requirements that can be guaranteed or is currently applied.

10. The method of claim 9, further comprising:

applying a rate adaptation to the session based on the QoS notification.

11. The method of claim 9, further comprising:

updating the requested QoS based on the QoS notification.

12. The method of claim 9, further comprising:

applying a rate adaptation to the session based on the one alternative QoS requirement that can be guaranteed or is currently applied.

13. The method of claim 9, further comprising:

updating the requested QoS based on the one alternative QoS requirement that can be guaranteed or is currently applied.

14. The method of claim 9, wherein the request contains an indication that a QoS notification feature is supported at the AF.

15. The method of claim 14, wherein the QoS notification feature is an AlternativeQoS_5G feature.

16. A network node comprising a processor and a memory, the memory comprising instructions enabling the network node to implement an Application Function (AF), the network node being configured to, when implementing the AF, perform:

transmitting, to a Network Exposure Function (NEF), a request to create a session with a requested Quality of Service (QOS), wherein the request contains one or more alternative QoS requirements; and receiving, from the NEF, a QoS notification indicating that the requested QoS is not guaranteed and further indicates one of the one or more alternative QoS requirements that can be guaranteed or is currently applied.

* * * * *